(12) United States Patent
Schwartz et al.

(10) Patent No.: US 8,683,016 B1
(45) Date of Patent: Mar. 25, 2014

(54) DATA RECORDING COMPONENTS AND PROCESSES FOR ACQUIRING SELECTED WEB SITE DATA

(75) Inventors: Elizabeth M. Schwartz, Austin, TX (US); Daniel P. Karipides, Round Rock, TX (US)

(73) Assignee: Versata Development Group, Inc., Austin, TX (US)

( * ) Notice: Subject to any disclaimer, the term of this patent is extended or adjusted under 35 U.S.C. 154(b) by 581 days.

(21) Appl. No.: 10/776,294

(22) Filed: Feb. 11, 2004

Related U.S. Application Data

(63) Continuation-in-part of application No. 10/324,764, filed on Dec. 20, 2002, and a continuation-in-part of application No. 10/699,148, filed on Oct. 31, 2003.

(51) Int. Cl.
*G06F 15/177* (2006.01)
(52) U.S. Cl.
USPC .......................................................... 709/220
(58) Field of Classification Search
None
See application file for complete search history.

(56) References Cited

U.S. PATENT DOCUMENTS

| | | | |
|---|---|---|---|
| 5,369,732 A | 11/1994 | Lynch et al. | |
| 5,515,524 A | 5/1996 | Lynch et al. | |
| 5,708,798 A | 1/1998 | Lynch et al. | |
| 5,765,143 A | 6/1998 | Sheldon et al. | 705/28 |
| 5,825,651 A | 10/1998 | Gupta et al. | |
| 5,958,003 A | 9/1999 | Preining et al. | |
| 6,002,854 A | 12/1999 | Lynch et al. | |
| 6,073,140 A | 6/2000 | Morgan et al. | |
| 6,076,108 A * | 6/2000 | Courts et al. | 709/227 |
| 6,085,220 A * | 7/2000 | Courts et al. | 709/201 |
| 6,195,679 B1 | 2/2001 | Bauersfeld et al. | |
| 6,282,404 B1 | 8/2001 | Linton | |
| 6,286,098 B1 | 9/2001 | Wenig et al. | |
| 6,360,249 B1 * | 3/2002 | Courts et al. | 709/203 |
| 6,405,308 B1 | 6/2002 | Gupta et al. | |
| 6,470,324 B1 * | 10/2002 | Brown et al. | 705/28 |
| 6,574,619 B1 | 6/2003 | Reddy et al. | |
| 6,629,153 B1 | 9/2003 | Gupta et al. | |
| 6,675,294 B1 | 1/2004 | Gupta et al. | |
| 6,681,247 B1 | 1/2004 | Payton | |
| 6,711,550 B1 | 3/2004 | Lewis et al. | 705/10 |
| 6,714,917 B1 | 3/2004 | Eldering et al. | |
| 6,792,605 B1 | 9/2004 | Roberts et al. | |

(Continued)

OTHER PUBLICATIONS

Myllymaki, "Effective Web data extraction with standard XML technologies", 2002.*

(Continued)

*Primary Examiner* — Shirley Zhang
(74) *Attorney, Agent, or Firm* — Terrile, Cannatti, Chambers and Holland, LLP; Kent B. Chambers

(57) ABSTRACT

Embodiments of the components and processes for recording selected Web site data described herein adhere to long-term stability guidelines so as to improve maintainability and viability over time. Additionally, the data recording components can be placed within a software architecture to minimize the number of redundant data recording components. Furthermore, the data recording components can be tailored to specific data recording purposes. Additionally, the data recording components can be designed to take into account system performance issues and minimally impact system performance. Furthermore, the data recording components can be tailored to gather specific data useful for various analytical processes. Additionally, embodiments of the data recording components are relatively easy to implement and able to handle idiosyncrasies and changes of various Web sites in which they are placed.

30 Claims, 10 Drawing Sheets

(56) References Cited

U.S. PATENT DOCUMENTS

| | | |
|---|---|---|
| 6,839,680 B1 * | 1/2005 | Liu et al. .................... 705/10 |
| 6,853,982 B2 | 2/2005 | Smith et al. |
| 6,912,505 B2 | 6/2005 | Linden et al. |
| 6,934,912 B2 | 8/2005 | Simpson et al. |
| 6,957,390 B2 | 10/2005 | Tamir et al. |
| 6,970,933 B1 | 11/2005 | Masters |
| 6,980,963 B1 | 12/2005 | Hanzek |
| 7,039,668 B2 | 5/2006 | Miyamoto |
| 7,043,407 B2 | 5/2006 | Lynch et al. |
| 7,134,137 B2 | 11/2006 | Joshi et al. |
| 7,152,018 B2 | 12/2006 | Wicks |
| 7,359,935 B1 | 4/2008 | Karipides et al. |
| 2002/0152284 A1 * | 10/2002 | Cambray et al. .............. 709/218 |

OTHER PUBLICATIONS

Karipides, U.S. Appl. No. 10/699,148, filed Oct. 31, 2003, titled Identifying quality user sessions and determining product demand with high resolution capabilities.

\* cited by examiner

DATA RECORDING COMPONENTS AND PROCESSES FOR ACQUIRING SELECTED WEB SITE DATA

CROSS-REFERENCE TO A RELATED U.S. PATENT APPLICATION

The present application is a continuation-in-part of U.S. patent application Ser. No. 10/324,764, filed Dec. 20, 2002, and entitled "GENERATING CONTEXTUAL USER NETWORK SESSION HISTORY IN A DYNAMIC CONTENT ENVIRONMENT", inventors Daniel P. Karipides and Susumu Harada, (herein referred to as the "Karipides I Application"). The Karipides I Application is incorporated herein by reference in its entirety.

The present application is also a continuation-in-part of U.S. patent application Ser. No. 10/699,148, filed Oct. 31, 2003, and entitled "IDENTIFYING QUALITY USER SESSIONS AND DETERMINING PRODUCT DEMAND WITH HIGH RESOLUTION CAPABILITIES", inventor Daniel P. Karipides, (herein referred to as the "Karipides II Application") which is incorporated herein by reference in its entirety.

BACKGROUND OF THE INVENTION

1. Field of the Invention

The present invention relates in general to the field of information processing, and more specifically to acquiring specific data generated during Web site sessions using well-designed data recording components.

2. Description of the Related Art

The use of networks, particularly the Internet, by users continues to rise as technology and interesting destinations increase. World wide web ("Web") sites continue to play an increasing role in the business models of many businesses. Sophisticated Web sites, such as many configuration Web sites, present a large number of navigation path options to a user, and, thus, a large amount of information about the user's activity and information presented to the user is potentially available for collection and analysis.

Information surrounding events of a user's Web site session can be very valuable information, particularly when attempting to understand the intent behind a user's actions. However, reliably capturing this knowledge and recording it in a useful and accessible format has proven elusive for conventional technology.

FIGS. 1 and 2 depict two Web systems and conventional attempts to capture session information. FIG. 1 depicts a static Web system 100. Web system 100 represents one of the original concepts for Web system and function. The Web site 108 includes a network of static hypertext markup language ("HTML") pages 102(a)-102(d) linked together via hyperlinks. During a user's Web session, i.e. the user's activity on a Web site during a fixed time-frame, browsers 104(a)-104(c) interact with the Internet information services ("IIS") Web server 106 over a network, such as the Internet or an intranet, to access static content. Note, Internet Explorer browsers and IIS Web server software are available from Microsoft Corporation of Washington and Netscape Navigator browsers are available from Netscape Communication Corporation. Such interaction works as follows. Each individual browser 104(a)-104(c) makes requests of specific, static HTML pages selected from HTML pages 102(a)-102(d). The Web server 106 receives these requests, locates the corresponding HTML page and sends back that HTML page to the requesting browser as a response. In essence, the Web server 106 functions as a warehouse for HTML pages 102(a)-102(d), with the ability to handle multiple requests for multiple pages at the same time.

The content of the HTML pages 102(a)-102(d) is not dynamic, i.e. the content of any page does not change from response to response. Hyperlinks on a particular page request other static pages when clicked on by the user, allowing the user to navigate the Web site 108.

IIS Web server 106 log records capture the request information from browsers 104(a)-104(c). However, the content of the responses is not logged. Generally this is unnecessary as the content does not change from response to response, so recording this information would not add useful information into the log files.

Thus, by recording each page accessed by a particular browser, a user's session could be recreated entirely, provided that an archival record is made of the content of each accessed page. For Web sites, such as an automotive or computer configuration Web site, creating the number of pages necessary to represent all possible configurations would require an enormous amount of memory. Additionally, any modifications to configuration options would typically require an enormous of amount of work to update or replace old pages.

FIG. 2 depicts a dynamic content generating Web system 200, which essentially makes interactive applications (such as a configurator, or a online retail site) available via the Web. Dynamic content allows a Web page to display current products in a user's shopping cart and display a different list depending on what items the user is considering for purchase. Similarly, for an auto configuration site, the available colors displayed on an exterior colors Web page depend on all the other choices the user has made before viewing the colors page.

Dynamic Web site 204 stores a minimal amount of static HTML pages. The vast majority of Web pages are generated using a much smaller number of dynamic content pages 210, such as Java Server Pages™ ("JSP"). JSP is an alternative Java™ based format engineered to manage dynamic content on the Web. Many versions of JSP supports the development of reusable modules often referred to as "actions" or "functions". A tag in the JSP page invokes a referenced tag function. ("Java Server Pages" and "Java" are trademarks of Sun Microsystems of Santa Clara, Calif.). When a request for one of the Dynamic content pages 210 arrives from any of browsers 206(a)-206(c), the Web server 202 forwards the request to the servlet runner application 208, such as "JRun" by Macromedia, Inc. of San Francisco, Calif. Servlet runner application 208 interprets the code on the requested JSP page along with a number of variables stored for each active user. The variables typically include data such as lists of items in a shopping cart and the parts chosen in an active configuration. Using the requested JSP page and the variables, the servlet runner application 208 generates an HTML page 212. Clearly the content of this html file is dynamic, changing with every request for the JSP page in question. The servlet runner application 208 passes the HTML page 212 to the IIS Web server 202. The IIS Web server 202 returns the HTML page 212 to the requesting browser. The content of this HTML page 212 is dynamic, changing with every browser request for a particular one of the JSP pages 210.

Note that from the perspective of the IIS Web server 202, for purposes of this discussion there is virtually no difference between a browser request for an HTML page and a JSP page. In both cases the response to a request is an HTML page. The IIS Web server 202 logs still only record the requests made to the IIS Web Server 202. The logs do not contain any information about the content of the responses. For example, in a server-side configuration or pricing application may generate data used to populate the HTML page 212. This server-side generated data provides values for many of the variables that are not recorded in the IIS Web Server 202 logs. In the case of static HTML pages 102(a)-102(d), this was not an issue because of the persistence of every HTML page. In the case of dynamic pages, much of the information contained in HTML page 212 is not recorded in the logs. Such information includes many of the details that are desirable to track such as configuration selection details, dealer search details, vehicle locate details, customer demographics, etc. For example, using browser 206(a), a user selects an exterior color on an automotive configuration Web site. While the IIS Web server 2002 log may reveal that a vehicle was configured, or that a particular exterior color was selected, the log would not indicate that the choice of exterior color also resulted in a change of interior color because this information is not included in the server response to the browser. Similarly, consider the case of a lead sent to a dealer. While the IIS log would indicate a request for the lead submission page, it would contain no information about the details of the lead because this information is not communicated to the browser.

Referring to FIG. 3, software layer architecture 300 of server 302 contains data recording hooks 304-308 distributed throughout various representative layers of the software layer architecture 300. Presentation layer 310 contains the software components that dictate elements of a user interface to be presented to a Web user. The JSP tag layer 312 contains software components primarily provide the content of fields in a Web page to be presented to a Web user. The server application layer 314 contains software components that process information received from a user and provide data to be inserted into a user interface by the tag layer 312 and presentation layer 310.

The data recording hooks 304-308 record data generated by the various layers of the software layer architecture 300. The data recording hooks 304-308 allow a Web site utilizing software layer architecture 300 to selectively record data that is not necessarily present in the user request and Web server response or other conventional data stream exchanged between a Web browser and a Web server.

Conventional data recording hook design and design methodology resulted in many difficulties. For example, the distribution of data recording hooks 304-308 as depicted in FIG. 3 presented multiple maintainability issues. Conventional thought was initially focused around the concept of having data recording hooks to augment conventional Web site data recording systems rather than on a design methodology for data recording hooks. As a result, many data recording hooks were either arbitrarily placed in various layers or placed in what appeared to be an advantageous layer but resulted in maintainability issues. For example, data is directly presented to the user through the presentation layer 310, and the user directly manipulates data at the presentation layer 310 level. Thus, the presentation layer 310 appears to be an ideal place from which to record data exchanged between the user and Web server. However, the presentation layer 310 is typically the layer that most often changes as Web sites update look-and-feel, simple functionality, and other visible and behavioral aspects. As a result, following updates, data recording hooks 304 could be deleted, become nonfunctional, or begin to collect incorrect or misleading data unless an extraordinary amount of care was taken during updates of presentation layer 310. Additionally, locating hooks in the presentation layer 310 and other higher level layers often necessitated the use of additional hooks because of the multiple paths through which a user can access essentially the same Web page. Accordingly, the value of data recording hooks 304 began to be offset with the extra effort needed to maintain data recording hooks 304.

The same types of maintainability issues also plagued data recording hooks 306 and 308. Although placed deeper in the software layer architecture 300, data recording hooks 306 and 308 were also not primarily associated with code portions that were substantially content stable over time. As a result, updates to deeper code layers raised many of the same maintainability issues associated with data recording hooks 304 in the presentation layer 310.

SUMMARY OF THE INVENTION

In one embodiment of the present invention, a method of recording data generated during a user Web site session includes placing all data recording components primarily in deep layers of a server-side software architecture, wherein the data recording components record data generated during the user Web site session.

In another embodiment of the present invention, a method of developing data recording components includes placing all data recording components as deep layers and genericizing the data recording components. The method further includes providing context insensitivity to the data recording components and minimizing information collected by each data recording component.

In a further embodiment of the present invention, a data recording system for enhanced recording of data generated during a Web session includes a processor and a computer readable medium coupled to the processor. The computer readable medium includes multiple software layers encoded therein and having data recording components for recording selected data generated during the Web session encoded therein, wherein the data recording components are at least primarily placed in deep layers of the software.

In another embodiment of the present invention, a computer program product having a computer program encoded therein, the computer program having multiple software layers and having data recording components for recording selected data generated during the Web session encoded therein. The data recording components are at least primarily placed in deep in the software layers.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Embodiments of the components and processes for recording selected Web site data described herein adhere to long-term stability guidelines so as to improve maintainability and viability over time. Additionally, the data recording components can be placed within a software architecture to minimize the number of redundant data recording components. Furthermore, the data recording components can be tailored to specific data recording purposes. Additionally, the data recording components can be designed to take into account system performance issues and minimally impact system performance. Furthermore, the data recording components can be tailored to gather specific data useful for various analytical processes. Additionally, embodiments of the data recording components are relatively easy to implement and able to handle idiosyncrasies and changes of various Web sites in which they are placed. A data recording component library design that makes it costly and difficult to build and maintain Web sites (and maintain that instrumentation properly) can be of little or no value.

Figure 1:
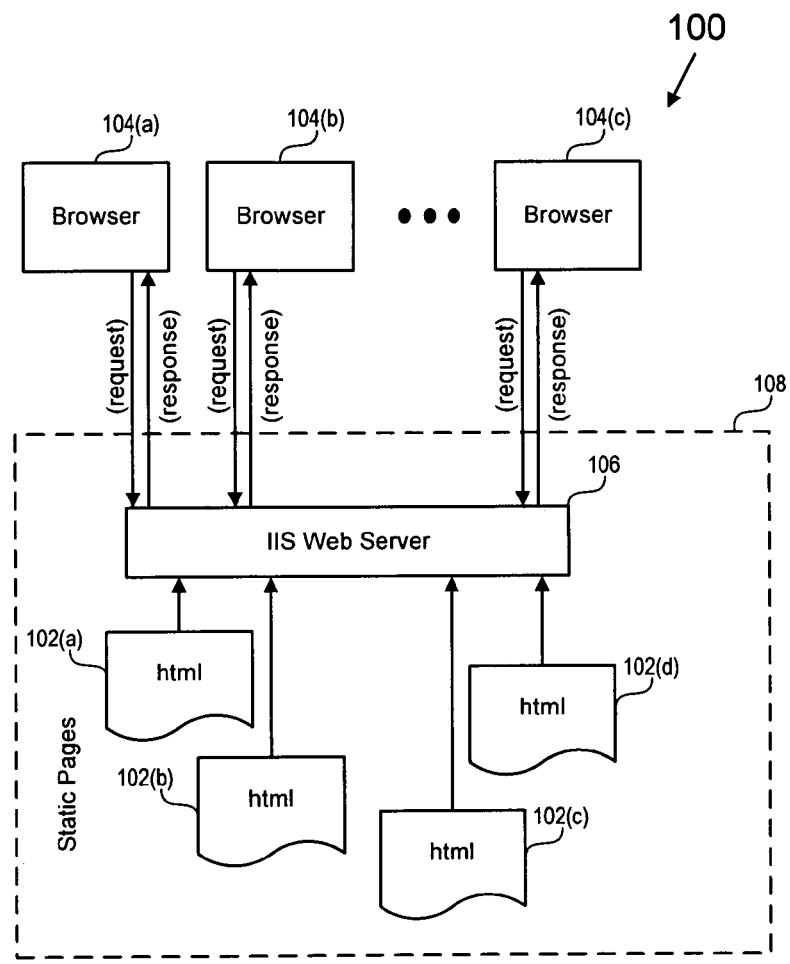
FIG. 1 (prior art) depicts a static Web system.
Figure 2:
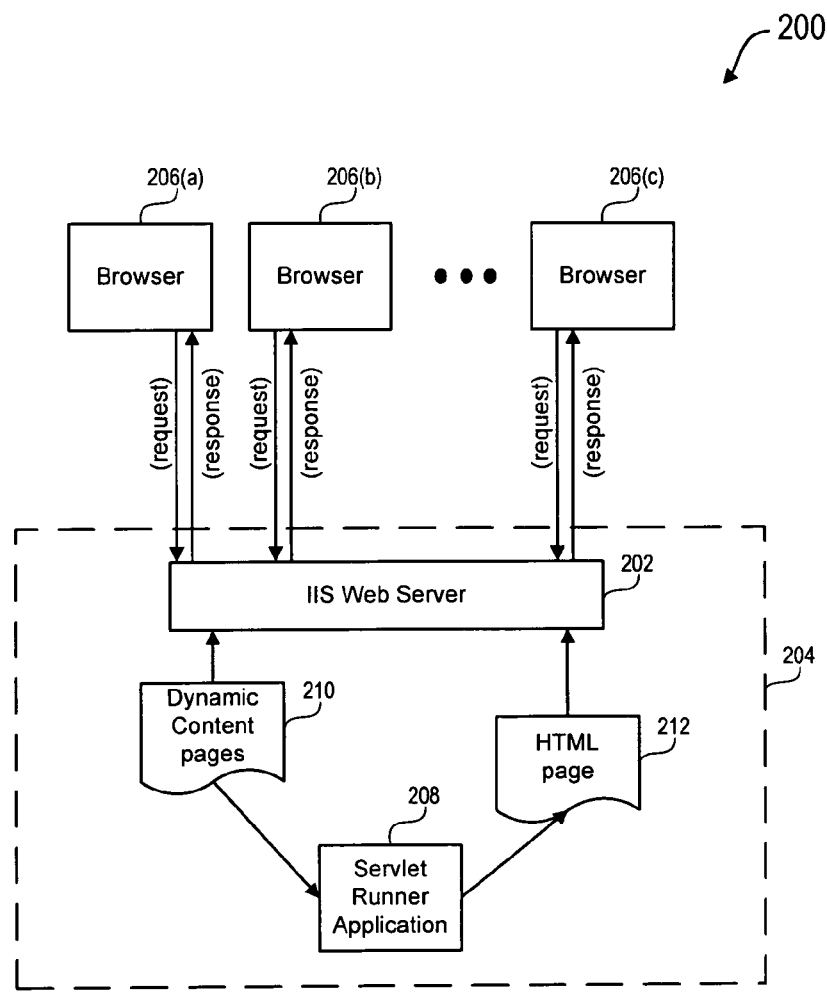
FIG. 2 (prior art) depicts a dynamic Web system.
Figure 3:
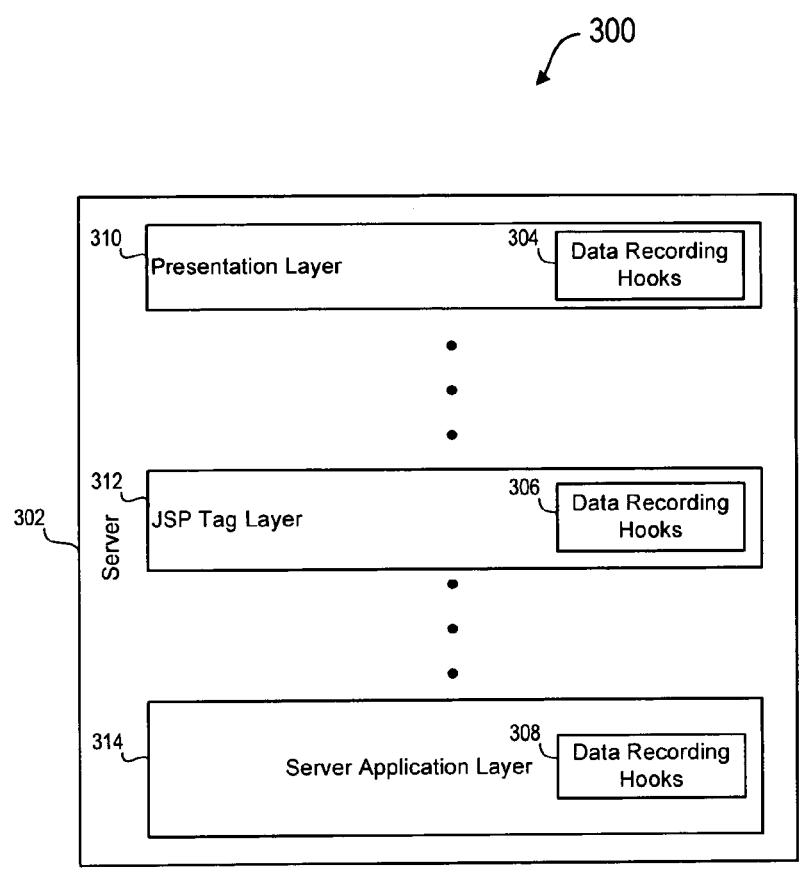
FIG. 3 (prior art) depicts data recording components arbitrarily distributed among various layers within a software layer architecture.
Figure 4:
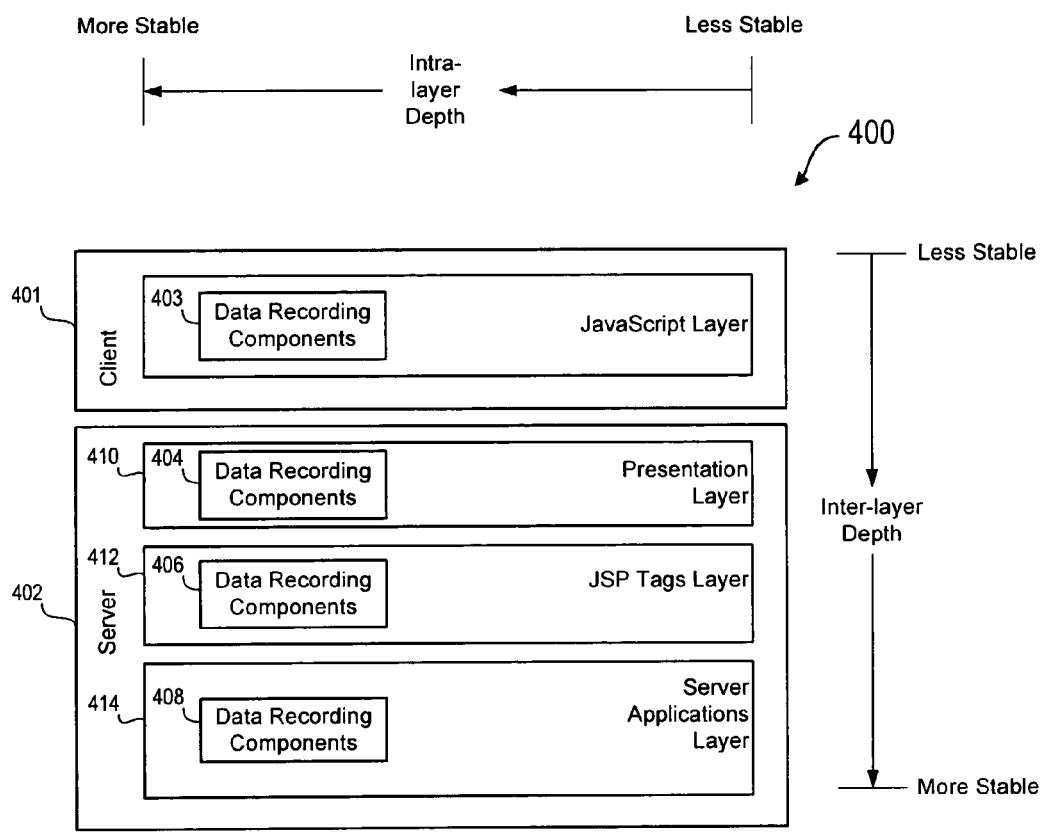
FIG. 4 depicts targeted placement of data recording component placement.

FIG. 4 depicts the targeted placement of data recording components ("DRCs") 403, 404, 406, and 408 in one embodiment of Web software layer architecture 400. DRCs 403, 404, 406, and 408 are also referred to as "hook recording components", "data recording hooks", or simply "hooks". Client-side applications 401 include a scripting layer, such as a JavaScript layer or flash-action script, which allows executable content to be included in Web pages. Thus, a Web page can include programs that, for example, interact with the user, control the browser, and dynamically create HTML content. On the client-side, data recording components 403 capture information that is created by user interaction with a browser. Server-side applications 402, data recording components 404, 406, and 408 are respectively placed in the presentation layer 410, JSP tags layer 412, and server application layer 414. The layers presented here are illustrative, and any multi-layer software architecture can utilize the data recording hook technology described herein. The server application layer 414 includes applications such as a configuration application by Trilogy Software, Inc. of Austin, Tex. The data recording components 406 record information that is generated as part of a JSP page 410. Similarly, the data recording components 408 record information that is generated by a server application. The server-side applications 402 and client-side applications 401 are designed to label specific data with labels associated with Record Types. The data recording components are designed to recognize such labels, thus allowing the data recording components to capture the desired data. It will be apparent to those of ordinary skill in the art that data recording components can be included as part of any application that can create and label data.

Figure 5:
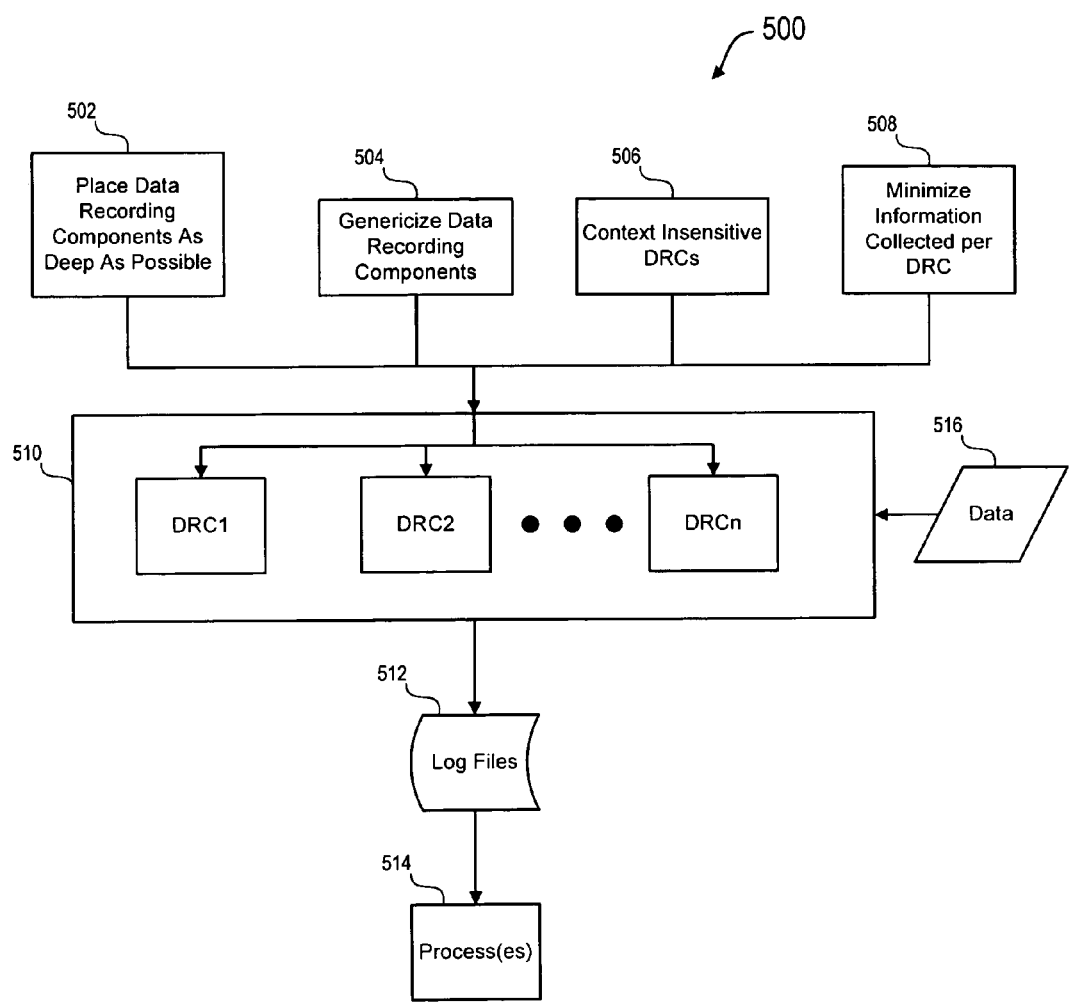
FIG. 5 depicts a data recording component recording process.

Referring to FIGS. 4 and 5, the DRC recording process 500 incorporates DRC guidelines 502-508 to provide efficient and effective recording of Web data 516. The DRC library 510 includes "n" DRCs, where "n" is the number of DRCs. Log files 512 store data recorded by DRCs 1 through n, and process(es) 514 include any process that utilizes the data stored in log filed 512. In real time processing, data could be stored in RAM or other memory type for processing by process(es) 514. The term "log files" includes any database or other way of storing data.

Several data recording component design guidelines, set forth in Table 1, have been developed to improve the effectiveness, usefulness, and efficiency of data recording components. These guidelines are described in more detail below.

TABLE 1

| Data Recording Component Design Guidelines | |
|---|---|
| 1. | Place DRCs As Deep As Possible from Intra-layer and Inter-layer Perspectives. |
| 2. | Genericize Data Recording Components |
| 3. | Context Insensitive DRCs |
| 4. | Minimize Information Collected per DRC |

Some portions of Web software layer architecture 400 have more content stability over time than others. Content stability generally refers to content in a software layer that remains unchanged over time to a degree that data recording components located within the software layer continue to function properly, even after revisions of applications in the software layer. Design choices involving DRC placement often arise, and accounting for content stability can help resolve such choices. The choices typically involve intra-layer depth and inter-layer depth placement of the DRCs. In almost all instances, in accordance with guideline 502 it is advantageous to place the DRCs as deep as possible both from an intra-layer and inter-layer perspective. Thus, contrary to conventional technology and design methodology, DRCs 403, 404, 406, and 408 are primarily, if not always, placed as deep as possible in the respective software layers. Furthermore most, if not all, DRCs have both intra-layer and inter-layer deep placement. Combined Intra-layer and Inter-layer depth is preferable, because it is generally the most stable over time. As depicted in FIG. 4, DRCs 408 reside the deepest from both the intra-layer and inter-layer perspective, and, thus, provide the largest content stability advantage.

There are several reasons for placing the DRCs as deep as possible. First, changes to the Web site are most often done in the presentation layer 410. Thus, greater content stability resides with increasing intra-layer and inter-layer depths. It is very possible for high-level DRCs to be either deleted or misplaced after changes to the presentation layer 410. Deeper DRC placement in the server application layer 414 significantly, if not totally, eliminates the possibility data interpretation corruption by presentation layer changes. For example, deeper DRC placement reduces the possibility of corrupting the demand signal described in the "Karipides II Application".

Second, the events that produce data relevant to data analysis, such as events that produce the demand signal described in the Karipides II Application, are often triggered from multiple places in the presentation layer 410. Thus, placing DRCs deeper from an inter-layer perspective can eliminate otherwise redundant DRC placement in higher layers, such as the presentation layer 410, that can occur when, for example, the same data can be generated depending on which navigational path a user selected. Placing the DRCs as deep as possible greatly reduces the risk that the event is not uniformly tracked through each invocation of the presentation layer 410. For example, consider an automotive Web site and a DRC that records information about a base vehicle selected by a user. The design of the Web site might provide three ways for a user to choose a base vehicle: from a vehicle research page, from a quick start page, and from a needs analysis page. If the example Web site is instrumented with DRCs in the presentation layer 410, the same DRC needs to be added in three separate places; it is certainly possible that one of these places may be overlooked. Instead, if the DRC is placed as deep as possible, it needs to be in only one location: where the application code actually loads a base vehicle in to the configurator. All existing (and future) pages that allow the user to select a base vehicle would then be handled automatically.

Opportunities often exist to capture a wide variety of data from a single user session on a Web site. In accordance with guideline 504, it greatly simplifies the design of DRC library 510 if individual DRCs are as generic as possible. This design allows for a specific DRC to be used in multiple instances in a Web site. For example, consider the DRCs preferred to capture the information a user enters into a form in order to request a catalog. The form requires information such as Last Name, City, and Home Phone. It is certainly possible to conceive of individual DRCs that are specific to record each of these pieces of information. But such a design quickly leads to an unmanageable number of DRC definitions, even when just considering the DRCs needed to record information from all form elements. A more robust design is for a generic DRC that can record the attribute and value for any form entry. This DRC can be invoked multiple times, once for each element in the form.

Given that DRCs should primarily be placed as deep as possible in the Web site, causing DRCs to record contextual information can place an unacceptable burden on the Web site design. In many cases, the context around why a particular piece of the low-level application code of a Web site is called is unknown. If the DRC recorded contextual information, this information would have to be passed from the presentation layer 410, through all intermediate layers, and down to the low-level sever application layer 414 where the DRCs 408 reside. Consider again the example of a DRC that records when the user selects a base vehicle. One contextual question in this case is, "For what purpose was a base vehicle selected?" Possible answers include: to begin the configuration process; to compare two vehicles for research purposes; or to examine the details of a manufactured vehicle on a dealer lot in a manner consistent with a configured vehicle. The DRC that is placed in the low-level server application layer 414 that selects the base vehicle cannot record this information, as the details of why the server application layer 414 was called remain in the presentation layer 410. Thus, in accordance with guideline 506, DRCs are at least primarily if not always context insensitive. Nevertheless, DRCs can be designed to record sufficient data to allow a user's session context to be reconstructed from data recorded. In one embodiment of DRC recording process 500, a parser reconstructs user session context as described in the Karipides II Application.

In accordance with guideline 506, each DRC preferably records a minimal amount of information. Guideline 506 primarily addresses hardware efficiency concerns. Thus, in one embodiment, each data recording DRC is optimized to record only a small amount of session information. Information from each Record is particularly meaningful when considered with information from other Records. These relatively small Records can be stored quickly and immediately after recording in memory in a persisting buffer referred to herein as a log file. The log file can be in a file, database, or other retrievable format. Records can also be immediately stored in fast temporary memory and subsequently stored in batch directly into a database or other storage. Batch saves could occur at predetermined times, such as periodically or during anticipated slow or down times. Recording and saving quickly result in the data recording DRCs having a small memory footprint on the web application server. Recording too much information with each DRC can place an unacceptable large burden on the Web servers that support a Web site. This burden can cause a serious degradation of fundamental Web server performance metrics such as average response time and maximum number of concurrent users. Such degradation can negatively affect user experience, which can, for example change the demand signal generated as described in the Karipides II Application. As with contextual information, it is the responsibility of a parser to reconstruct the user's session context from the information recorded by various DRCs. Individual DRCs preferably only record minimal information to support this reconstruction.

DRCs can be implemented and executed within a software layer using any well-known computer science technologies, such as multithreading, lazy-recording, rotating file serialization.

Figure 6:
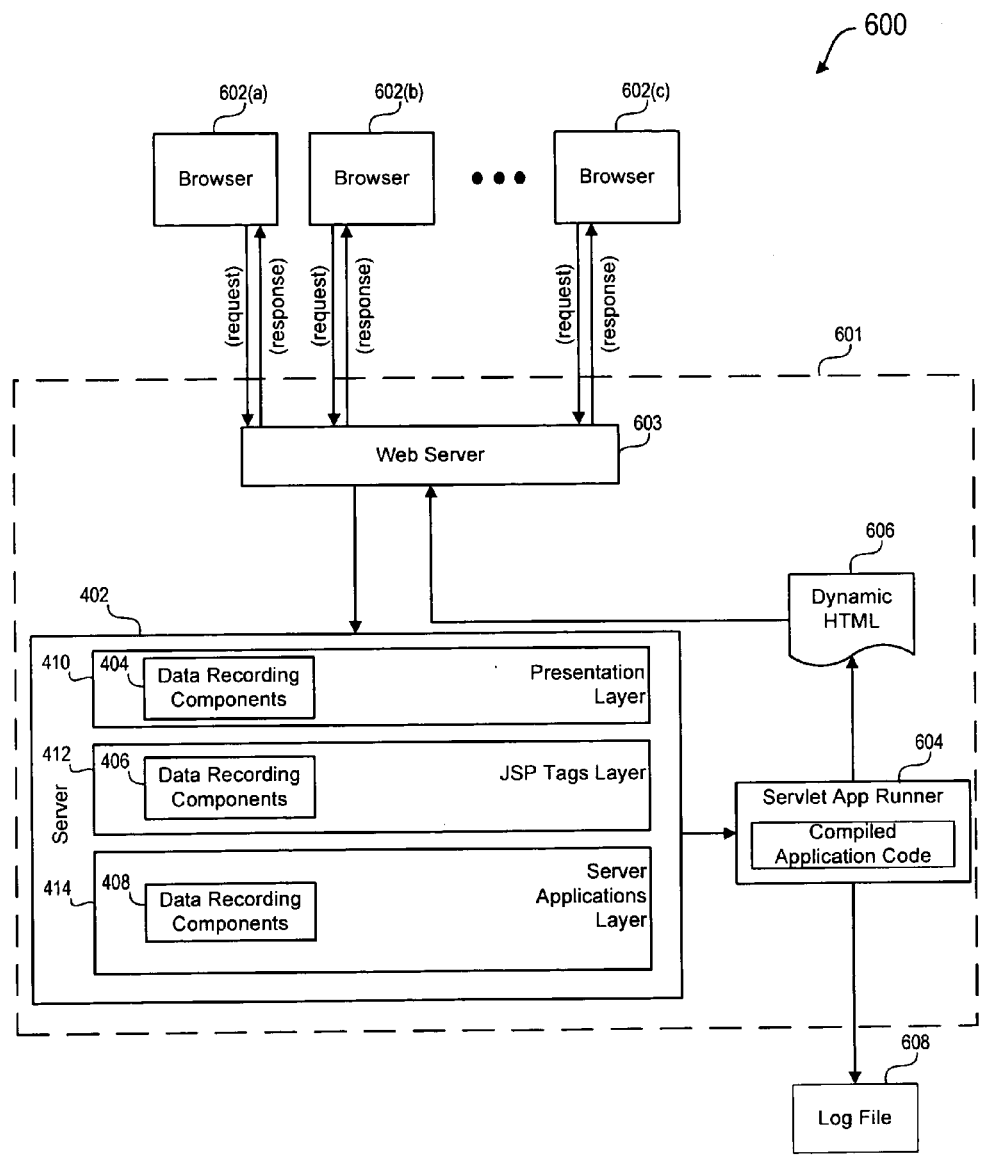
FIG. 6 depicts a Web system that includes data recording components.
Figure 7:
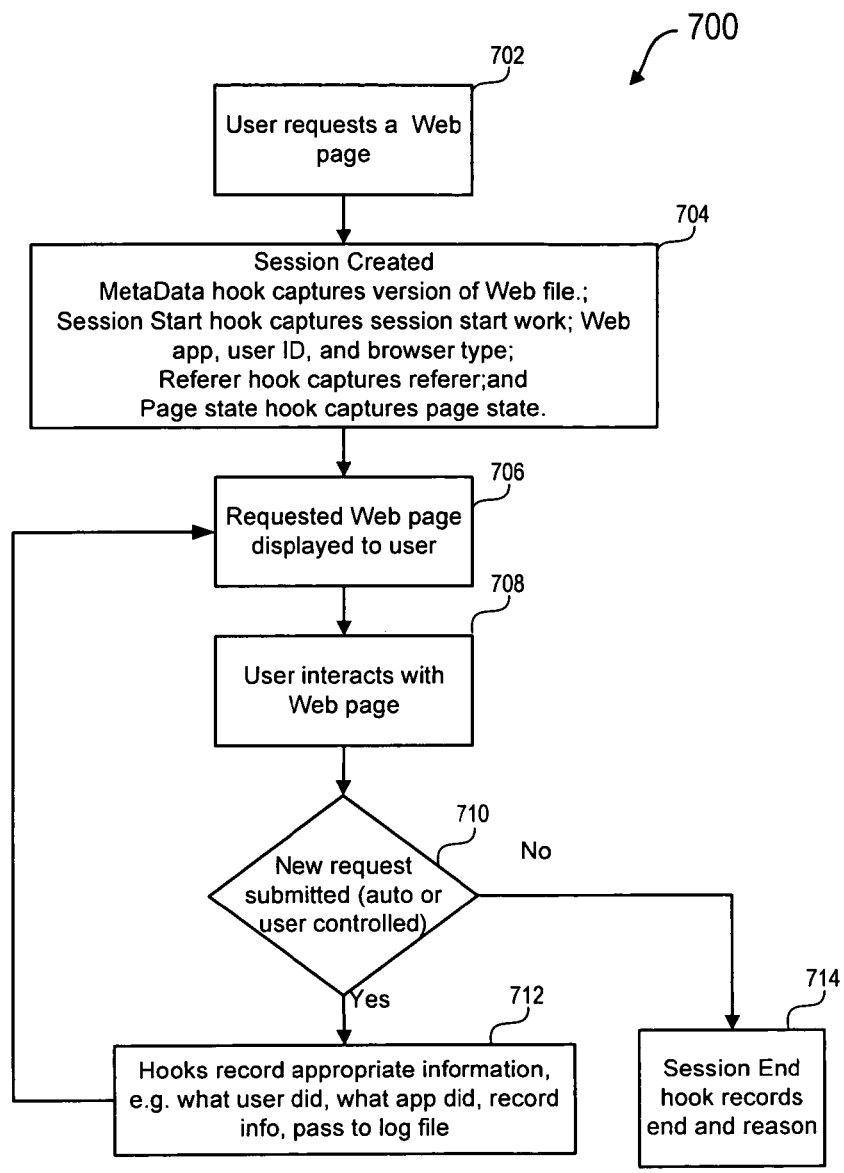
FIG. 7 depicts a Web system that includes a session recording and parsing system using data recording components.

FIG. 6 depicts Web system 600 that includes Web application server 601, which exchanges requests and responses with browsers 602(*a*)-602(*c*). Browsers 602(*a*)-602(*c*) are identical to browsers 206(*a*)-206(*c*) except that browsers 602(*a*)-602(*c*) may contain data recording components, as described above. Referring to user interaction and session recording process 700 depicted in FIG. 7 and Web system 600, a user first requests a Web page in operation 702. In operation 704, when the Web server 603 receives a page request from any of browsers 602(*a*)-602(*c*), a session is created and any calls to data gathering hooks are executed. For example, a MetaData DRC captures a version of a Web file, a Session Start DRC captures session start work, Web app type, user ID, and browser type, a Referrer hook captures a referrer ID, and Page State DRC captures page state transitions and page state name. In operation 706, the Web Server 603 provides the first requested to the user. In operation 708, the user interacts with the returned Web page.

If the user makes a new request for a JSP page or a request is auto submitted by the user's browser 602, server-side applications 402 respond by populating the requested JSP page from JSP layer 412 in accordance with the request. For example, in an automotive configuration web application server 601, the request may be for a JSP page that contains information on power and transmission choices for a selected vehicle. The JSP tags layer 412 and the server application layer 414, which would include a configuration engine, populate the JSP page with the appropriate configuration information for the selected vehicle. The servlet runner application 604, such as JRun, compiles the requested JSP page into application code. In operation 712, when the application code includes a data gathering hook, the data gathering hook is executed and captured information is stored as a Record in log file 608 as described above. Additionally, execution of the application code generates the dynamic HTML page 606, which Web server 603 passes to the requesting browser as a response to the browser's page request in operation 712. In operation 708, the user interacts with the requested JSP page, which may include ending the session. If the session is ended, user interaction process 700 proceeds from operation 710 to operation 714, where the Session End hook records the end of the session and a reason for ending.

Because of the small memory footprint of the data gathering hooks, any change in performance of Web server 603 is inconsequential. Record session data into the log files at the same time that the dynamic HTML content is generated allows session information to be captured in the log files that is unavailable from other sources. As discussed in more detail below, the captured session information allows relationships to be found between the Records that would be extremely difficult to discern through other means. The relationships present a fuller, more complete history of a user's Web session than possible with conventional technology.

Figure 8:
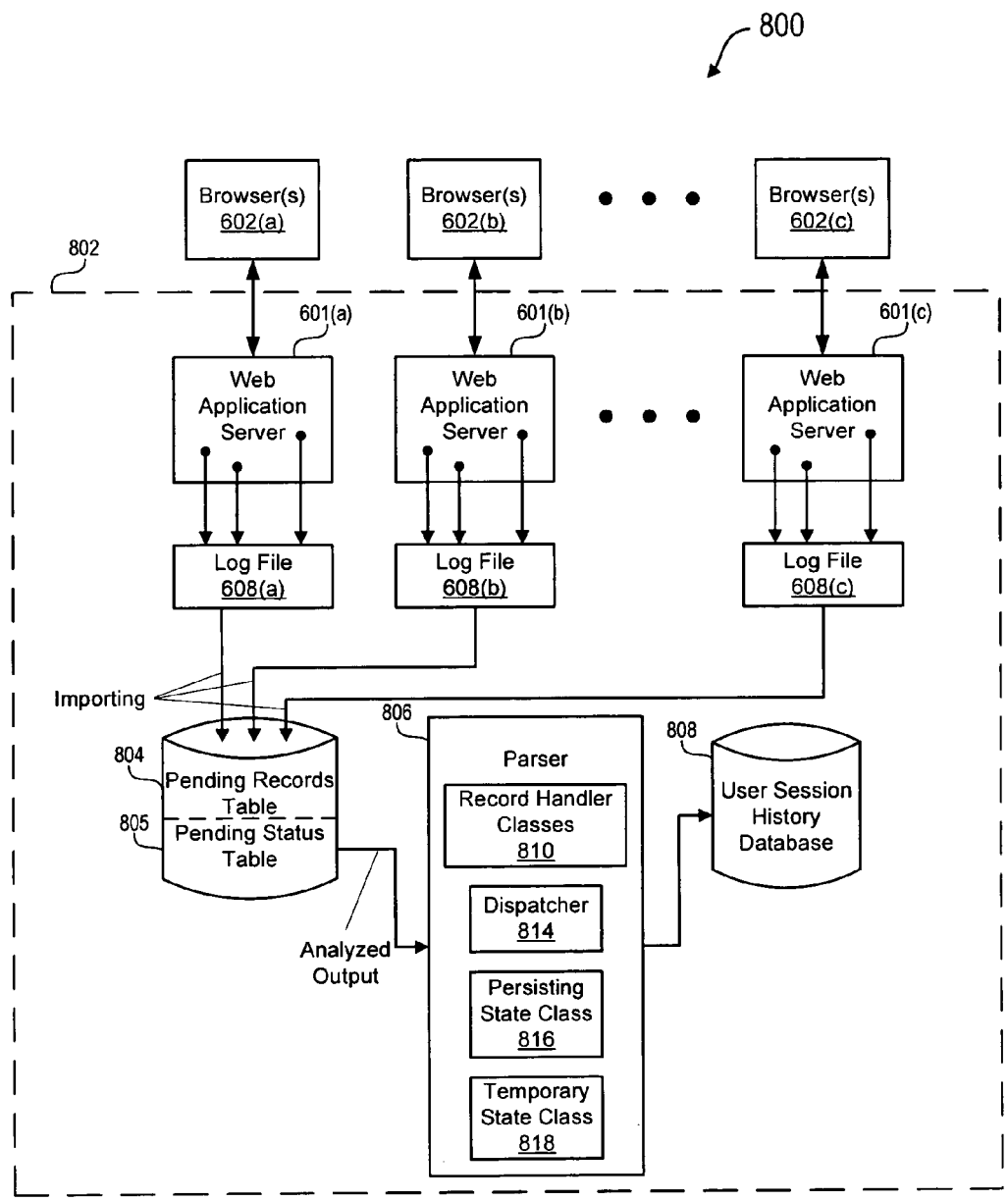
FIG. 8 depicts a user interaction and session data recording process implemented by the Web system of FIG. 7.

FIG. 8 depicts Web system 800 having an SRP System 802. The SRP System 802 includes any number of Web application servers 601, with each specific Web application server being denoted by a parenthetical letter. As described above each Web application server 601 writes Records to a log file 608. In one embodiment, each Web application server 601 writes Records to a separate log file, i.e. Web application server 601(*a*) writes to log file 608(*a*). In another embodiment, each Web application server 601 writes to the same log file.

Capturing user session information and recording the information in Records is one part of the process of assembling a useful user session history. Another part is parsing the Records. A user may generate a large amount of information. Often, the Records should adhere to certain rules if the recorded data is complete and accurate. Additionally, interrelationships exist between many of the Records. These interrelationships can be evaluated using a set of predetermined rules. The rules not only identify the interrelationships of Records, the rules can validate Records by determining if the interrelationships are valid. For example, a product configuration Web site may have a rule requiring a zip code to be entered prior to allowing a user to configure a product. If SRP System 802 creates Records that record the product configuration history but no zip code or location Record is located, then the product configuration Records cannot be validated. Similarly, a rule may require valid configuration Records before a lead is credited with a referral. If the configuration Records cannot be validated, neither can the lead Record. Thus, in one embodiment, the accuracy and completeness of all Records for a session are suspect, and the session's Records are not parseable.

To re-create the historical context of the user's session, in one embodiment, the Records in log files 608 are imported to a database having a pending records table 804 and a pending status table 805. All of the Records contained in the log files 608 are analyzed and a determination is made whether the Records are suitable for parsing. If the Records are suitable for parsing, the analyzed Records are passed to parser 806. Parser 806 includes a number of code classes such as record hander classes 810, dispatcher class 814, persisting state class 816, and temporary state class 818, which are discussed in the Karipides I Application. Any unsuitable Records received are discarded. The Records are parsed by sorting the Records by a user session identifier and building up an interrelationship of the Records using a dispatcher 814 to dispatch Record names to Record handlers 810. Record handlers 810 pass information to state class(s) 812. The interrelationship of the Records is built against a set of rules. The parser 806 saves the parsed Records in the user session history database 808. The Karipides I Application describes additional details of SRP System 802.

In one embodiment, each of the DRCs 403, 404, 406, and 408 is written as a method call to any callable language, such as Java. The data recording DRCs are capable of capturing information associated with record types and recording the captured data, as discussed in more detail below. Following are example methods, written in Java, for capturing the record types "MetaData" and "SessionStart". In one embodiment, the first method (valueBound( )) is called at the beginning of every user session. The actual data recording DRCs for MetaData and SessionStart are the calls "recordMetaData" and "recordSessionStart", respectively:

```
public void valueBound( HttpSessionBindingEvent event )
{
    // DRC : Record DRC version information
    RecorderWrapper.getInstance( ).recordMetaData(
        userContext.getContextID( ),
            Constants.Value.VERSION, "2.6" );
    // DRC : Record SessionStart
```

-continued

```
    RecorderWrapper.getInstance( ).recordSessionStart(
        userContext.getContextID( ),
            "WebSiteNamev2",
            this.webServer,
            this.userAgent,
            this.remoteAddr );
}
```

The following method is called every time a part is selected by a user of a configuration Web site. The recoring DRC for capturing and recording the Record type Part State uses other classes in the server-side applications 402, specifically in this case the JSP rags layer 412 that support the server applications layer 414 (UserContext, ModelFlowInfo, etc.) to gather the information for the Part State record type. In the code below, the data recording DRC is labeled "recordPartState":

```
protected void onSelect( TWCDispatchContext dc, Part part,
boolean state )
{
    UserContext ctx = UserContext.getUserContext( dc.getSession( ) );
    ModelFlowInfo flowInfo = ctx.getConfigContext( ).
    getModelFlowInfo( );
    String displayName =
        flowInfo.getDisplayNameForPartClass(
            part.getParent( ).getPropertyString( ModelConstants.NAME ) );
// DRC : Record part set (explicit selection)
    RecorderWrapper.getInstance( ).recordPartState( ctx.getContextID( ),
                                    displayName,
                                    part.getPropertyString(
    ModelConstants.DESCRIPTION ),
                                    state );
} DRCs capture and record user session related data. In one
embodiment, data that will provide the desired user session history
is divided into discrete record types.
Record types may be further defined by subrecords, and so forth.
```

As described in more detail below DRCs are preferably designed and located in Web software layer architecture 400 to record various pieces of Web session related data to fulfill data needs by process(es) 514. There are several pieces of information that should be recorded by all DRCs in order to facilitate a robust demand signal generation process as described in the Karipides II Application. Each DRC preferably records the data contained in Table 2.

TABLE 2

| Data Element | Definition | Reason |
| --- | --- | --- |
| SessionID | Unique identifier for each individual user experience. | Allows records from multiple user sessions to be sorted in to collections of individual user experiences |
| SequenceNumber | Number that identifies the order in which the DRC information was recorded | Allows records to be sorted so that the order of user actions and application responses can be maintained throughout parsing |

In one embodiment, every call to a data recording DRC creates a record ("Record"). Records may have a standard structure such as the schema depicted below:

| Record Schema | | | | |
|---|---|---|---|---|
| Session ID | Time Signature | Sequence Number | Record Name | Record Data |

A description of each element of a Record is as follows:

Session ID—An identifier, unique to each user session, that allows a collection of Records to be sorted into individual user experiences at a later time.

Time Signature—An indication of when the event represented by the Record occurred, typically accurate to the millisecond timeframe or less.

Sequence Number—A counter indicating the order of Records as written by the server application. For Records of an individual session, the sequence number is therefore guaranteed to be increasing, but not continuous.

Record Name—An identifier for the type of the Record.

Record Data—A string representation of the specific data for the Record. Interpretation of the data differs depending on the name of the Record.

One example process 514 that utilizes data recorded by DRCs is the product demand resolution system described in the Karipides II Application which generates a high-resolution demand signal. A product demand signal can be generated for any type of Web site including retail Web sites and Web sites that allow users to select and/or configure products that do not actually exist ("prelaunch microsites"). A manufacturer might build a product or use futures selected on a micro Web site depending on analysis of the user's session. Various queries and analytic analyses performed against the high-resolution demand signal of the Karipides II Application are categorized below in Table 3. Not only is the ability to record the information recorded by the DRCs in the manner described herein of significant interest that exceeds conventional technological capabilities, the identification of the particular data to record is also of particular interest.

TABLE 3

DRC Analytic Analysis Categories for High-Resolution Demand Signal Generation

| | |
|---|---|
| 1. | Feature Bundle Demand |
| 2. | Determining User Intent Behind Tradeoffs Under Constrained Configuration |
| 3. | Guided Selling and Needs Analysis Configuration Analyses |
| 4. | Imbalance and Correlation Between Demand and Offline Data |
| 5. | Regional Analysis |
| 6. | Time Series Analysis |
| 7. | Feature Substitutability |
| 8. | Decision Path Analysis |
| 9. | Price Sensitivity |
| 10. | Demographic Profiling |

The nature of each analytic analysis category and associated DRCs used to record data for performing the analytic processes associated with each category in Table 3 are described below. Conventional data processing has not contemplated such an extensive array of collected data targeted toward a data intensive analytical process such as the demand signal generation process described in the Karipides II Application due to, for example, the limitations in the scope of conventional user session data collection.

Feature Bundle Demand

Generically, features are defined as configurable product components. Examples of features would be the hard disk in a computer, a bread dough attachment for a kitchen mixer, or an optional canopy on a fishing boat. In the automotive industry, the product is a vehicle and features are often packages, options or accessories. Engine, a luxury package, power moonroof, and floor mats are all examples of features on a vehicle. The demand for a feature can be represented as the percentage of customers who desire the feature. For example, the demand for automatic transmission on a particular vehicle might be 75%.

A feature bundle is defined as a combination of individual feature choices. One might be interested in the demand for the combination of V8 engine, towing package and skid plates on trucks without an extended bed, for example.

When measured using online configuration data, the accurate calculation of feature and feature bundle demand uses more information than simply 'what features were parts of each consumer's final configuration.' Information around how the feature became part of the configuration (Was it directly selected by the user? Was it included because of a product validation rule enforced by the configuration engine?) is also useful. Additionally, knowledge of the customer's awareness level of features (Which subset of features were shown to the consumer?) is also preferable to record.

Feature Bundle Demand—DRCs:

Record Types: ProductSelection and FeatureDetail.

The ProductSelection DRC records the information in Table 4 about the product line that chosen by the user. For each category of generic retail configuration sites, the specific information could be quite different. For automotive retail configuration sites, the DRC should record information about the base vehicle chosen by the user.

TABLE 4

| Subrecord | Definition | Reason |
|---|---|---|
| Version | Identifies the version of the product in question | Multiple versions of the same product are often available at the same time |
| Manufacturer | Entity that produces the product | The products of multiple manufacturers are sometimes presented on the same Web site |
| Product | Specific designation of the product | Multiple products are often presented on the same Web site |
| Subproduct | More granular specification of the product (typically something such as 'Elite', 'Deluxe', or 'Professional'). | Multiple subproducts are often available on the same model |

Timing: A ProductSelection DRC should record information any time the user selects a new product to configure.

FeatureDetail

The FeatureDetail DRC records the information in Table 5 about each feature on a completed configuration. Each invocation of the FeatureDetail DRC records information about a single feature. The FeatureDetail DRC is invoked multiple times—once for each feature on the completed configuration.

TABLE 5

| Subrecord | Definition | Reason |
|---|---|---|
| Name | Presentation description of the feature | Details of the description of the feature as seen by the user could influence the interpretation of demand |
| Identifier | Code that identifies the feature (more stable than the name, which often changes over time) | Allows analysis to merge differently named representations of the same conceptual feature |
| State | Indicates whether the feature was selected by the user, included automatically by other selections, or completed to satisfy configuration rules | Allows analysis to interpret the selection differently depending on whether it was chosen directly or implicitly. (For example, analysis may interpret explicit selections as a stronger indicator of demand.) |
| Visibility | Indicates whether or not the feature was presented to the user | By configuring an item online, users indicate their demand for only those product components that are shown to them. Analysis of demand should account for this fact. |

Timing: A set of FeatureDetail DRC records should be recorded whenever the user reaches a significant decision point in the configuration and purchase process. These points could be: when the user finishes making selections; when the user chooses to start over with a new product offering; when the user searches for existing products that best match their choices; when the user chooses to save their configuration; when the users prints a summary of their configuration; or when the user has the Web site email a friend a link to the configuration. In the automotive context these decision points correspond to completing a vehicle configuration, selecting a new vehicle to configure, or attempting to locate matching vehicles that exist in dealer inventory.

Determining User Intent Behind Tradeoffs Under Constrained Configuration

In many cases, features are not available individually. Some features that might be considered separate in the minds of most users are only available as part of a predefined package. In other cases, the selection or deselection of an individual feature automatically includes or excludes other features. Sophisticated Web sites will notify the user any time their selection (or deselection) will include or exclude other features or affect price significantly. Such notifications are termed notables, and the user may either accept or decline the notable. A notable presentation DRC records data to accurately analyze the driving force behind the tradeoffs a user makes when he/she decides whether to accept a notable.

Determining User Intent Behind Tradeoffs Under Constrained Configuration—DRCs
Record Types: NotablePresented, NotableDetail, and NotableResponse.
NotablePresented.

Whenever a notable is presented to a user, the inclusion/exclusion choices presented to the user are recorded. The following specific elements Table 6 are recorded with each presentation to a user.

TABLE 6

| Subrecord | Definition | Reason |
|---|---|---|
| TypeOfNotable | Some notables are triggered by inclusions; others, exclusions, and still others by price changes. | Allows for the categorization of notables during analysis; |

TABLE 6-continued

| Subrecord | Definition | Reason |
|---|---|---|
| RejectPrice | Price of the product if the user rejects the notable | Price sensitivity analysis requires the price of the product if the notable is rejected |
| AcceptPrice | Price of the product if the user accepts the notable | Price sensitivity analysis requires the price of the product if the notable is accepted |
| (NotableKey) | Unique identifier for the notable | Allows other records to refer back to a specific NotablePresented record. This may not be necessary, depending on the Web site design, so this subrecord is optional. |
| (TriggerFeature) | Some identification of the feature whose selection or deselection caused the notable to occur | Understanding what user action triggered the notable is typically relevant to any analysis. This Subrecord is optional, as it may be possible to infer this information from the context of the other events, depending on the design of the Web site. |

Timing: Each time a notable is presented to the user, the data of a NotablePresented record should be recorded.
NotableDetail Feature inclusion and exclusion notables indicate a list of additional features that will either be added or removed from the configuration if the notable is accepted. In one embodiment, analysis of the contents of these lists is vital in understanding the tradeoffs users are making when they are forced to make compromises. A NotableDetail DRC records information about each feature in the 'include' or 'remove' lists. Table 7 sets forth the particular information recorded.

TABLE 7

| Subrecord | Definition | Reason |
|---|---|---|
| FeatureName | Presentation description of the feature | Details of the description of the feature as seen by the user could influence the interpretation of demand |
| FeatureIdentifier | Code that identifies the feature (more stable than the name, which often changes over time) | Allows analysis to merge the same conceptual feature that has experienced trivial changes in its description |
| Include/Remove | Indicates whether the feature will be added or removed if the notable is accepted | Analysis must account for whether each feature is being added or removed |
| (NotableKey) | Link back the NotablePresentation | Allows the parser to rebuild the complete experience surrounding the notable. This Subrecord is optional, as it may be possible to infer this information from the context of the other events, depending on the design of the Web site. |

Timing: Every time a NotablePresented record is recorded, it must be accompanied by a series of NotableDetail records, one for each feature in the include/remove list shown to the user.
NotableResponse In one embodiment, recording the accept/reject response of the user to the notable is critical in understanding the tradeoffs being made by the user—it is a direct indication of intent and desire of the user. Accordingly, the NotableResponse DRC records the information in Table 8.

TABLE 8

| Subrecord | Definition | Reason |
| --- | --- | --- |
| Decision | Indicates whether the user accepted or rejected the notable | As with other actions, this is preferred for any feature tradeoff analysis. |
| (NotableKey) | Link back the NotablePresentation | Allows the parser to rebuild the complete experience surrounding the notable. This Subrecord is optional, as it may be possible to infer this information from the context of the other events, depending on the design of the Web site. |

Timing: A NotableResponse DRC should record information each time a notable decision is made by a user.

Guided Selling and Needs Analysis Configuration Analyses

Often included with more sophisticated Web sites is functionality that allows the user to focus on the ideal desired product rather than on the specific features available. Such functionality is typically termed guided selling or needs analysis.

The analyses that can be performed on data gathered from these sections of the Web site are similar to those described in the section 'Feature Bundle Demand' with three exceptions. First, the features available to the user are more generic than those of a more structured configuration site. Examples of this include 'Large Hard Disk' vs. '136 GB Hard Disk' and 'Seating for >5 People' vs. 'Leather Bucket Seats'. Second, the configuration choices are less constrained; the reduced set of rules allows users to more freely express their preferences though an ideal set of features. Third, the distinction between separate products is often blurred so that users can consider generic features across multiple products simultaneously.

Guided Selling and Needs Analysis Configuration Analyses—DRCs Record Types:

Record Types: ProductGroupSelection, GenericFeatureSelection, and EndItemFeatureInfo.

ProductGroupSelection

Similar to vehicle selections in constrained configuration, guided selling and needs analysis configuration Web sites allow for the user to pick a group of vehicles of varying generality. The specificity of the group can range from a particular model, through a more general grouping such as 'large trucks', to extremely generic groups such as 'all SUV's and trucks'. Accordingly, the ProductGroupSelection DRC records the information in Table 9.

TABLE 9

| Subrecord | Definition | Reason |
| --- | --- | --- |
| Name | Description of the product group as seen by the user | The description can strongly affect user choices and therefore the demand signal. |
| (Manufacturer) | Entity that produces the product | The products of multiple manufacturers are sometimes available on the same Web site; Optional because the generality of the product group may not require a make to be specified |

TABLE 9-continued

| Subrecord | Definition | Reason |
| --- | --- | --- |
| (Product) | Specific designation of the product | Multiple products are often presentedon the same Web site; Optional because the generality of the product group may not require a model to be specified |
| (Version) | Identifies the version of the product in question | Multiple versions of the same product are often available at the same time; Optional because the generality of the product group may not require a year to be specified |

Timing: A ProductGroupSelection record should be persisted every time a user selects a group of products.

GenericFeatureSelection

This GenericFeatureSelection DRC is analogous to the FeatureSelection DRC, with the added capabilities of handling generic feature definitions. Given the unconstrained nature of many configuration processes, it is possible that a selection could actually be a simultaneous selection of a group of the possible choices. As an example, a user presented with a choice of 'no radio', 'radio', 'radio with CD', and 'radio with 6 CD Changer' might select both of the choices referencing a CD player. Such selections are not allowed in more constrained configuration. Accordingly, the GenericFeatureSelection DRC records the information in Table 10.

TABLE 10

| Subrecord | Definition | Reason |
| --- | --- | --- |
| Type | Boolean flag that indicates whether the user action was a selection or deselection. | As with other actions, the data collected by the Type Subrecord is preferred for any analysis of user intent. |
| FeatureList | Token-delimited list of the features that were selected or deselected | Given the less constrained nature of the process, it is vital to understand what actually was presented to the user |

Timing: A GenericFeartureSelection DRC should be invoked for each generic feature selection by a user.

EndItemFeatureInfo

Just as with a constrained configuration process, there typically is some point in the unconstrained process where the user is satisfied with their choices and the configuration is considered "finished". A wealth of information about unconstrained demand can be gained by examining these finished configurations. Accordingly, the EndItemFeatureInfo DRC records the information in Table 11

TABLE 11

| Subrecord | Definition | Reason |
| --- | --- | --- |
| Visibility | Indicates whether or not the feature was presented to the user | By configuring an item online, users indicate their demand for only those product components that are shown to them. Analysis of demand must account for this fact. |
| DisplayOrder | Ranking of the order in which the feature was presented to the user | Can be used to correct for biases caused by the presentation order |

TABLE 11-continued

| Subrecord | Definition | Reason |
|---|---|---|
| SelectionOrder | Ranking of the order in which the feature was selected | Contrasting this with the DisplayOrder can give insight into user demand |
| FeatureList | Token-delimited list of the features that were selected or deselected | Given the less constrained nature of the process, it is vital to understand what actually was presented to the user |

Timing: EndItemFeatureInfo records should be persisted whenever a guided selling or needs analysis user configuration is considered finalized. One record should be included for each possible feature of the vehicle group in question.

Imbalance and Correlation Between Demand and Offline Data

The demand signal generation process as described in the Karipides II Application can generate a high-resolution demand signal. Comparing this demand signal with supply can reveal interesting imbalances that suggest changes in supply. Additionally, large imbalances often lead to changes in other offline business metrics. Examining the correlation between imbalance and various offline metrics can be very valuable.

The primary challenge in determining these imbalances is being able to compare the demand signal and supply signals down to the most detailed feature level. It is therefore important that the feature demand is captured with enough information that this comparison is feasible. In most cases, this is accomplished by logging identifiers for each part. These identifiers either match directly to those used to identify feature information in the supply signal, or can be translated so that a match is possible.

The FeatureDetail, FeatureSelection, and NotableDetail (described above) all have a Subrecord devoted to storing this external identifier.

Regional Analysis

A key dimension to many of the analyses enabled by the demand signal generation process as described in the Karipides II Application is regional preference. The ability to restrict the scope of the analyses to specific geographical regions or to compare analysis results across regions is pivotal to these analyses. Three types of regions can support this: standard geographic regions such as zip code, company-specific regions such as dealer sales representative territories (which can be used for offline correlations as described above), or custom-defined regions tailored to match geographic differences in observed customer preferences.

Regional Analysis—DRCs
Record Types: Region and DealerSelection.
Region

In one embodiment, the most fundamental piece of information that must be captured to enable regional analysis is some code that identifies the geographical location of the user. The granularity of the geographical distinction varies with each Web site. Accordingly, the Region DRC records the information in Table 12.

TABLE 12

| Subrecord | Definition | Reason |
|---|---|---|
| Identifier | Information that identifies the regional location of the user, typically something like postal or zip code | Allows regional analyses to segment the demand signal geographically |

Timing: The Region DRC should be invoked any time the user enters geographical information.

DealerSelection

In industries that employ dealers and territories, there is an additional piece of information that is useful when filtering analyses along regional lines: dealer selection information. For example, an automotive configurator should record information about which, if any, automotive dealers the user identifies during the shopping process. The knowledge of which dealers a user is interested in provides a direct way to map user demand directly to a company-specific regional hierarchy. Accordingly, the DealerSelection DRC records the information in Table 13.

TABLE 13

| Subrecord | Definition | Reason |
|---|---|---|
| Name | Presentation description of the dealer chosen by the user | Useful for reporting purposes |
| Identifier | Code that identifies the dealer (more stable than the name, which can change over time) | Used to map the dealer selection with dealer information in offline, company-specific data sources in the event that the dealer's name may change |
| (Distance) | Distance between the user's region and the dealer | Can be used to mapping of user to dealer demand; Optional as this information may not be available or deemed necessary for the mapping to be calculated |

Timing: A DealerSelection record should be saved every time the user indicates a preference for a particular dealer.

Time Series Analysis

Another key component to many of the analyses enabled by the demand signal generation process as described in the Karipides II Application is the ability to assess the effect of time on user selections, either by restricting the scope of the analyses to specific time periods, by inferring user priorities by selection order, or by examining demand trends over time. In one embodiment, this puts two distinct preferences on the design of the DRC library. The first is that the precise times of the user session and constituent events are to be recorded. The second is that since the Web site (and therefore the user experience) can change with time, thus, analysis techniques must be adapted accordingly.

Time Series Analysis—DRCs

Record Types: Version and SessionStart

Version

To correctly interpret user demand faced with changes in the user experience, a Version DRC is used to indicate what specific implementation of the Web site was presented to the user. It is expected that the version number recorded may be mapped during parsing to specific releases of the Web site. Accordingly, the Version DRC records the information in Table 14.

TABLE 14

| Subrecord | Defintion | Reason |
|---|---|---|
| VerionNumber | Identifies the specific version of Web site that provided the user experience | Allows each user session to be mapped to a specific implementation of the Web site |

Timing: The Version DRC records information once per session. Typically this is done at the beginning of each user session, as the interpretation of the other records by the parser depends heavily on the version of the Web site that was instrumented by the DRCs.

SessionStart

The most direct way to capture the time that the user session started is to have a specific DRC dedicated to storing that information at the start of each session. Each DRC could also record the time it was invoked. Under this second paradigm, a separate DRC to record the time is not necessary—the time indicated in the first record is sufficient to associate the user session with a particular time period. Accordingly, the SessionStart DRC records the information in Table 15.

TABLE 15

| Subrecord | Definition | Reason |
| --- | --- | --- |
| StartTime | Time and date the session started | For analyzing the effects of time on consumer behavior. |

Timing: The SessionStart record should be recorded at the start of every session.

Feature Substitutability

Substitutability analyses center around using demand data to determine the willingness of users to accept similar features when the desired feature is unavailable. Potentially, any source of data the centers around the user making tradeoff decisions can helpful in when determining feature substitutability.

One source of such tradeoff decisions is inherent in the notable data, as detailed in the section titled 'Determining User Intent Behind Tradeoffs Under Constrained Configuration'. The DRCs defined there record sufficient information to support a feature substitutability analysis; for brevity, those DRC definitions will not be repeated here.

Feature Substitutability—DRCs

Record Types: LocateSummary, LocateDetails, and RequestForQuote.

LocateSummary

One of the best sources of data around user tradeoff information can be gathered when the consumer conducts an online search for already manufactured products similar to their idealized configured product. Analysis of which actual products were most interesting to the consumer can be extremely helpful in calculating feature substitutability. The LocateSummary DRC is unique in that all of its Subrecords may be optional, depending on the design of the Web site. In one embodiment, it is merely sufficient to log that a locate request was initiated by the user and all pertinent information can be inferred from the context. Accordingly, the LocateSummary DRC records the information in Table 16.

TABLE 16

| Subrecord | Definition | Reason |
| --- | --- | --- |
| (Score) | Calculated rank of the quality of the match between the products returned by the locate search and the configured product | Significance of subsequent user actions could be interpreted differently based on the demand score as, for example, determined in the Karipides II Application; Optional because this data may not be deemed necessary to calculate feature substitutability. |

TABLE 16-continued

| Subrecord | Definition | Reason |
| --- | --- | --- |
| (Dealer) | Identifies the dealer whose inventory was searched | Allows the dealer inventory at the time of the locate request to be included in the analysis; This Subrecord is optional, because it may be possible to infer this information from the context of the other events, depending on the design of the Web site. |
| (ProductKey) | Link back to the idealized configured product | Information used to decompose user action about vehicles into substitutability rules for features. This Subrecord is optional, because it may be possible to infer this information from the context of the other events, depending on the design of the Web site. |

Timing: The LocateSummary DRC should be invoked every time a user attempts to locate their configured product and is presented with a list of closely matching existing products.

LocateDetails

After being presented with the results of a locate request, the user often chooses specific products to examine more detail. The analysis of examining which exact products the user chooses to view details on is often fundamental to understanding feature substitutability. Accordingly, the LocateDetails DRC records the information in Table 17.

TABLE 17

| Subrecord | Definition | Reason |
| --- | --- | --- |
| ProductIdentifier | External identifier to the specific product-in the automotive context, this is typically the VIN of the vehicle in question | Allows for features of the located vehicle to be determined via external data sources |
| (Score) | Specific score indicating the match between the configured and located product | Importance of the details request may be tempered by the value of the score; Optional because this scaling may not be deemed necessary to calculate feature substitutability. |

Timing: A LocateDetails record should be written each time a user requests additional information about specific product returned as part of a locate summary.

RequestForQuote

Another way the user indicates preference of one located product over another is to initiate contact with the seller of the product. Requesting a quote for an actual product is often a stronger indication of acceptance than simply requesting details. Accordingly, the RequestForQuote DRC records the information in Table 18.

TABLE 18

| Subrecord | Definition | Reason |
| --- | --- | --- |
| ExternalIdentifier | Allows for the request to be matched to external systems | Enables information such as whether a sale completed and how the sold product differed from the configured and located products to be included in the analysis |

Timing: For every request for price or general contact made to a seller, a RequestForQuote record should be persisted.

Decision Path Analysis

Additional insight into user demand can be gained from examining the paths that users take as they traverse the Web site and the selections they make along those paths. One might interpret the actions of a user who follows one particular pattern of contextual activity differently than another user who follows a different path.

Decision Path Analysis—DRCs

Record Types: Page View, UnexpectedRequest, and FeatureSelection.

Page View

Each Web page that is rendered and presented to a user is termed a page view. A collection of page view serves to define the path the user takes while configuring and shopping on a Web site. Accordingly, the Page View DRC records the information in Table 19.

TABLE 19

| Subrecord | Definition | Reason |
|---|---|---|
| PageName | The basic identifier for which page was viewed | Fundamental building block to determining |
| (SequenceNumber) | Value that indicates the order in which the page was viewed by the user | the user's path User path information can only be determined if the page views can be ordered; Optional because all DRCs may record a sequence number, which allows for the sorting of Page View records as well |

Timing: A Page View record should be logged for each and every page presented to a user.

UnexpectedRequest

Given the typical design of Web sites, users may use a Web browser refresh and back-button controls to skip around the suggested flow and visit pages in a non-linear manner. To reconstruct a user's session context, the Web server preferably logs every time the Web server receives an unexpected request from a client browser. Such requests are indications of non-linear site flow, and any path analysis should take such indications into account. Accordingly, the UnexpectedRequest DRC records the information in Table 20.

TABLE 20

| Subrecord | Definition | Reason |
|---|---|---|
| RequestedSequenceNumber | Identifies the unexpected sequence number that was requested by the user | Assuming all requests are ordered and that this order is cached in the request itself, this information can be used to determine to where in a user's session path history tree the non-linear flow has returned. |

Timing: Any time the server receives an unexpected request, it must invoke an UnexpectedRequest DRC.

FeatureSelection

The features a user selects during a Web session can also provide insight into a user's overall intent. The direct action of selection or deselecting a feature is perhaps the most direct way a user can indicate their preference for or against a feature. As such, feature selections can be very important when generating a demand signal. Accordingly, the FeatureSelection DRC records the information in Table 21.

TABLE 21

| Subrecord | Definition | Reason |
|---|---|---|
| FeatureName | Presentation description of the feature | Details of the description of the feature as seen by the user could influence the interpretation of demand |
| FeatureIdentifier | Code that identifies the feature (more stable than the name, which often changes over time) | Allows analysis to merge the same conceptual feature that has experienced trivial changes in its description |
| Type | Boolean flag that indicates whether the user action was a selection or deselection. | Analysis accounts for whether each feature is being added or removed |

Timing: A FeatureSelection DRC should be invoked every time a feature is selected or deselected by a user.

Price Sensitivity

A more specialized aspect of user demand is price sensitivity, which is defined as the degree to which the cost of a feature affects the user demand for a feature. Data concerning price sensitivity can be used in a variety of ways including helping to set advertised prices on features and helping to targeting marketing offers to the right consumer groups. It is assumed that prices can be varied in some manner in order to support the sensitivity analysis.

One source of price sensitivity data, the NotablePresented DRC, is referenced in the section 'Determining User Intent of Behind Tradeoffs Under Constrained Configuration'. This DRC already records price information and therefore requires no modification to support a price sensitivity analysis.

Price Sensitivity—DRCs

Record Types: FeatureSelection, ProductSelection, and Promotion.

FeatureSelection

Price sensitivity can be understood by knowing what features were selected by a user along with the price of the feature that was displayed when the user made the selection. Pricing rules in complex configuration Web sites are often themselves complex, so recording the price that was actually visible to the user can be very important.

The primary elements of a FeatureSelection DRC are listed in the section 'Decision Path Analysis' and are not re-listed here. The Subrecord depicted in Table 22 should be added to the FeatureSelection DRC to support price sensitivity analysis.

TABLE 22

| Subrecord | Definition | Reason |
|---|---|---|
| Price | Displayed price of the feature at the time of the selection | Input to pricing analysis. |

ProductSelection

In many cases, an additional piece of information is preferred to correctly interpret feature selections and prices—the price of the base product. In the automotive specific context, this corresponds to the price of the base vehicle. The price of the base product relative to the feature prices may influence how the sensitivity analyses are conducted.

The primary elements of the ProductSelection DRC are listed in the section 'Feature Bundle Demand' and are not repeated here. The element depicted in Table 23 should be added to the ProductSelection DRC to support price sensitivity analysis.

TABLE 23

| Subrecord | Definition | Reason |
|---|---|---|
| Price | Displayed price of the base product at the time of the selection | Input to pricing analysis. |

Promotion

In some cases, special offers or promotions will be active, discounting a specific feature or feature bundle. Knowledge of what incentives were visible to the user affects any price sensitivity analysis. Accordingly, the Promotion DRC records the information in Table 24.

TABLE 24

| Subrecord | Definition | Reason |
|---|---|---|
| Name | Name of the promotion, as presented to the user | Details of the description of the promotion as seen by the user could influence the interpretation of demand |
| Identifier | Key that allows the program to be identified in an external data source | Enables details of incentive programs to be included in the analysis |
| (PriceChange) | Amount of the promotional offer | The size of the promotion is vital to interpreting user response to it. Optional because it may be possible to reference this information using the identifier and an external data source. |

Timing: Any time an incentive or program is offered to the user, a Promotion record should be recorded.

Demographic Profiling

Another general classification of analyses that can be performed with demand data is demographic profiling. An understanding of where users are coming from and information about their backgrounds and economic standings is invaluable when managing current product offerings and planning future ones.

Identifying the geographic region associated with each user is also helpful when performing demographic profiling. The information gathered here is the same preferred in the section "Regional Filtering of Analyses". However, in this case, the region code stored is typically cross-referenced with external sources that prescribe income levels, average home prices, and many other demographic variables to each region code.

Another source of demographic information is similar to that preferred in the section 'Price Sensitivity'. Knowing the prices of products and features selected allows some demographic information to be inferred about the user.

Demographic Profiling—DRCs

Record Types: SessionStart and Referrer.

SessionStart

When attempting to build up demographic information about a user, it is helpful to track return visits to the Web site by the same user. When this information is available, it should be recorded whenever a new session starts and a return visitor is identified. The primary element of the SessionStart DRC is detailed in the section 'Time Series Analysis', and will not be repeated here. The element depicted in Table 25 should be added to allow tracking of return visits to a Web site.

TABLE 25

| Subrecord | Definition | Reason |
|---|---|---|
| VisitorIdentifier | Identifier that is constant for a user across multiple site visits. | Allows for multiple visits to the Web site by the same user to be identified |

Referrer

In many cases, users do not navigate to a Web site by directly entering a URL. A link on another separate and distinct Web site forwards them to the retail site. In this context, this second site that contains the forwarding link is known as the site referrer. Knowledge of the site referrer allows for a quick and efficient categorization of the users of a Web site. Accordingly, the Referrer DRC records the information in Table 26.

TABLE 26

| Subrecord | Definition | Reason |
|---|---|---|
| Referrer | Identifier of the external Web site that contained the forwarding link for the retail site; In many cases, the Web site design requires that referring sites identify themselves in a known manner by embedding information in the referring URL. | Allows for a quick categorization of users |

Timing: The site referrer by definition only needs to be recorded once, at the beginning of each session.

User Information

At certain decision points during the user experience on a Web site, the user may be preferred to enter additional information about themselves. Examples of these activities include submitting a request for quote, requesting a credit application, or simply requesting a brochure, catalog, or more information. Where allowed by privacy policies, capturing this information can provide a wealth of information that is useful in demographic profiling. Accordingly, the Session-Start DRC records the information in Table 27.

TABLE 27

| Subrecord | Definition | Reason |
|---|---|---|
| Attribute | Descriptor for the piece of information entered by the user; examples are last name, city, and age. | Allows various pieces of user information to be cataloged and analyzed together |
| Value | Specific value entered by the user | Information used to drive a demographic analysis. |

Timing: A UserInformation record should be stored for every relevant field in a form where additional information is requested from the user. Typically a series of UserInformation records will be saved for a single form.

Figure 9:
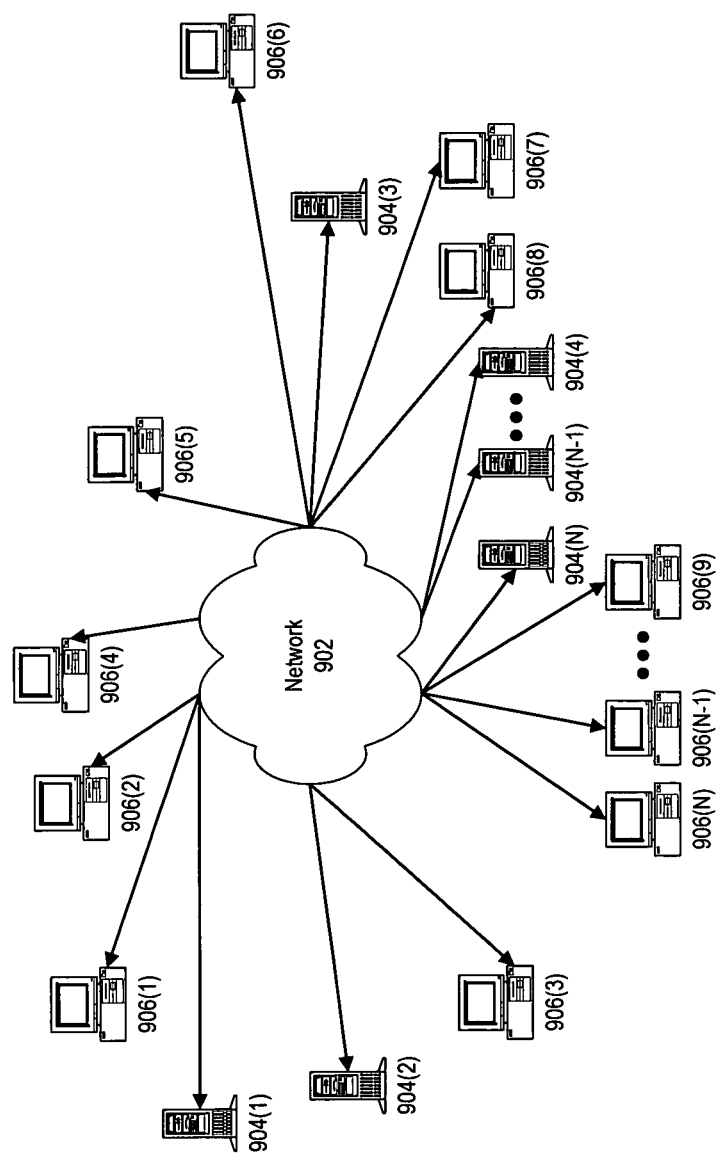
FIG. 9 depicts a network of computer systems in which a data recording components can be used.

FIG. 9 is a block diagram illustrating a network environment in which a DRC recording process may be practiced. Network 902 (e.g. a private wide area network (WAN) or the Internet) includes a number of networked server computer systems 904(1)-(N) that are accessible by client computer systems 906(1)-(N), where N is the number of server computer systems connected to the network. Communication between client computer systems 906(1)-(N) and server computer systems 904(1)-(N) typically occurs over a network, such as a public switched telephone network over asynchronous digital subscriber line (ADSL) telephone lines or high-bandwidth trunks, for example communications channels providing T1 or OC3 service. Client computer systems 906(1)-(N) typically access server computer systems 904(1)-(N) through a service provider, such as an internet service provider ("ISP") by executing application specific software, commonly referred to as a browser, on one of client computer systems 906(1)-(N).

Client computer systems 906(1)-(N) and/or server computer systems 904(1)-(N) may be, for example, computer systems of any appropriate design, including a mainframe, a mini-computer, a personal computer system including notebook computers, a wireless, mobile computing device (including personal digital assistants). These computer systems are typically information handling systems, which are designed to provide computing power to one or more users, either locally or remotely. Such a computer system may also include one or a plurality of input/output ("I/O") devices coupled to the system processor to perform specialized functions. Mass storage devices such as hard disks, compact disk ("CD") drives, digital versatile disk ("DVD") drives, and magneto-optical drives may also be provided, either as an integrated or peripheral device. One such example computer system is shown in detail in FIG. 10.

Figure 10:
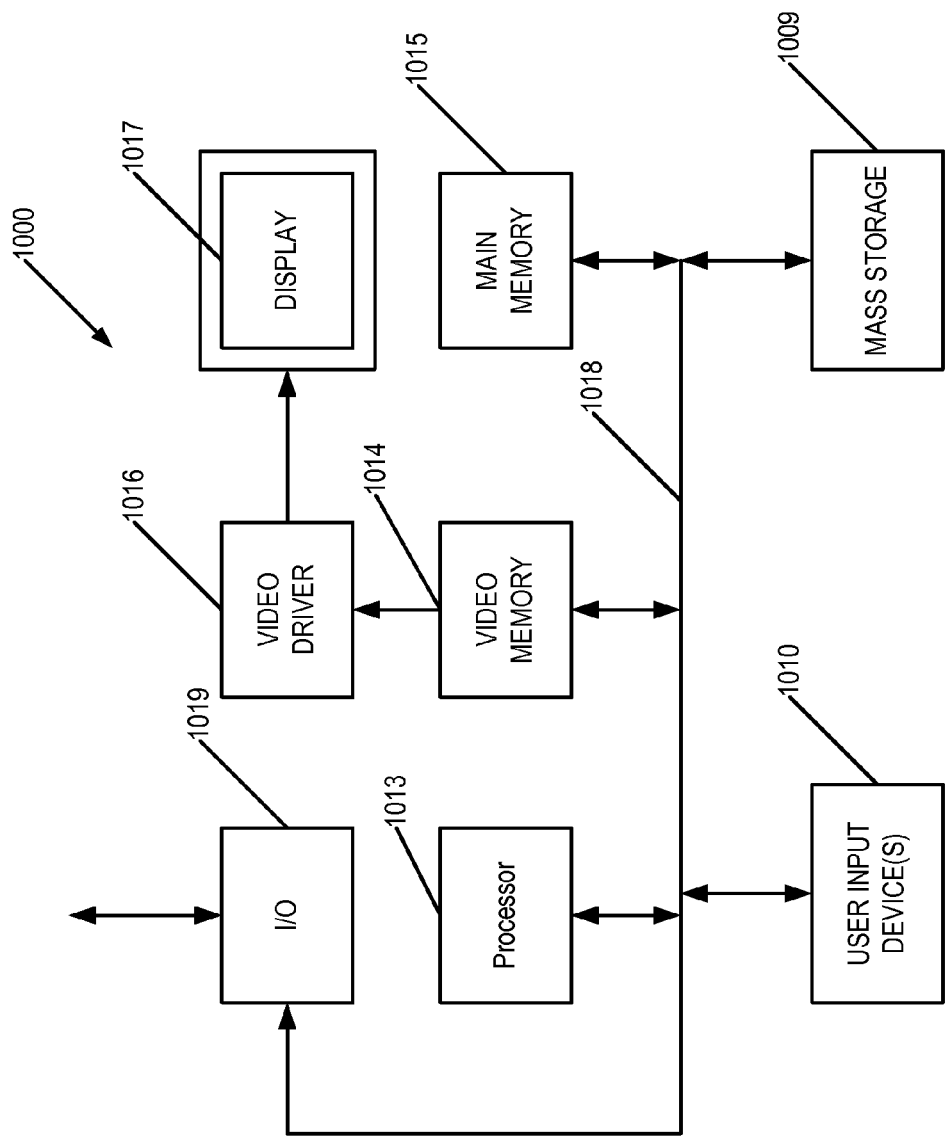
FIG. 10 depicts a computer system with which a system utilizing data recording components can be implemented.

Embodiments of the DRC recording process can be implemented on a computer system such as a general-purpose computer 1000 illustrated in FIG. 10. Input user device(s) 1010, such as a keyboard and/or mouse, are coupled to a bi-directional system bus 1018. The input user device(s) 1010 are for introducing user input to the computer system and communicating that user input to processor 1013. The computer system of FIG. 10 generally also includes a video memory 1014, main memory 1015 and mass storage 1009, all coupled to bi-directional system bus 1018 along with input user device(s) 1010 and processor 1013. The mass storage 1009 may include both fixed and removable media, such as other available mass storage technology. Bus 1018 may contain, for example, 32 address lines for addressing video memory 1014 or main memory 1015. The system bus 1018 also includes, for example, an n-bit data bus for transferring DATA between and among the components, such as CPU 1009, main memory 1015, video memory 1014 and mass storage 1009, where "n" is, for example, 32 or 64. Alternatively, multiplex data/address lines may be used instead of separate data and address lines.

I/O device(s) 1019 may provide connections to peripheral devices, such as a printer, and may also provide a direct connection to a remote server computer systems via a telephone link or to the Internet via an ISP. I/O device(s) 1019 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 1009 until loaded into main memory 1015 for execution. Computer programs may also be in the form of electronic signals modulated in accordance with the computer program and data communication technology when transferred via a network. The method and functions relating to DRC recording process may be implemented in a computer program alone or in conjunction DRC recording process.

The processor 1013, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 1015 is comprised of dynamic random access memory (DRAM). Video memory 1014 is a dual-ported video random access memory. One port of the video memory 1014 is coupled to video amplifier 1016. The video amplifier 1016 is used to drive the display 1017. Video amplifier 1016 is well known in the art and may be implemented by any suitable means. This circuitry converts pixel DATA stored in video memory 1014 to a raster signal suitable for use by display 1017. Display 1017 is a type of monitor suitable for displaying graphic images.

The computer system described above is for purposes of example only. The DRC recording process may be implemented in any type of computer system or programming or processing environment. It is contemplated that the DRC recording process might be run on a stand-alone computer system, such as the one described above. The DRC recording process might also be run from a server computer systems system that can be accessed by a plurality of client computer systems interconnected over an intranet network. Finally, the DRC recording process may be run from a server computer system that is accessible to clients over the Internet.

Many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it should be understood that various changes, substitutions and alterations can be made hereto without departing from the spirit and scope of the invention as defined by the appended claims.

What is claimed is:

1. A method of recording data generated during a user Web site session, the method comprising:
    recording data generated during a user Web site session using data recording components, wherein the data recording components are placed in multiple layers of a server-side software architecture, the data recording components in the multiple layers are placed (i) in deep layers of the server-side software architecture for inter-layer depth and (ii) in intra-layer locations deep within the layers for intra-layer depth, wherein:
        each of the deep layers for inter-layer depth is a layer whose content is more stable over time relative to content in at least a plurality of other layers that do not have the data recording components,
        for each of the intra-layer locations deep within the layers for intra-layer depth, content for the locations deep in the layer is more stable over time relative to content of at least a plurality of other locations in the same layer, and
        recording the data includes the data recording components saving the data to a memory.

2. The method of claim 1 further comprising:
    processing the data recorded by the data recording components to analyze the user Web site session for an analytical purpose.

3. The method of claim 2 wherein the analytical purpose is selected from one or more of the following: Feature Bundle Demand, Determining User Intent Behind Tradeoffs Under Constrained Configuration, Guided Selling and Needs Analysis Configuration Analyses, Imbalance and Correlation Between Demand and Offline Data, Regional Analysis, Time Series Analysis, Feature Substitutability, Decision Path Analysis, Price Sensitivity, or Demographic Profiling.

4. The method of claim 1 wherein recording data generated during a user Web site session using data recording components:
  recording data using generic and context insensitive data recording components.

5. A method of developing Web session data recording components, the method comprising:
  placing data recording components, used in Web session data analysis, in multiple layers of a server-side software architecture, the data recording components in the multiple layers are placed (i) in deep layers of the server-side software architecture for inter-layer depth and (ii) in intra-layer locations deep within the layers for intra-layer depth, wherein:
    each of the deep layers for inter-layer depth is a layer whose content is more stable over time relative to content in at least a plurality of other layers that do not have the data recording components,
    for each of the intra-layer locations deep within the layers for intra-layer depth, content for the locations deep in the layer is more stable over time relative to content of at least a plurality of other locations in the same layer, and
    recording the data includes the data recording components saving the data to a memory.

6. The method of claim 5 further comprising:
  selectively implementing the data recording components according to an analytical purpose for data recorded by the data recording components.

7. The method of claim 6 wherein the analytical purpose is selected from one or more of the following: Feature Bundle Demand, Determining User Intent Behind Tradeoffs Under Constrained Configuration, Guided Selling and Needs Analysis Configuration Analyses, Imbalance and Correlation Between Demand and Offline Data, Regional Analysis, Time Series Analysis, Feature Substitutability, Decision Path Analysis, Price Sensitivity, or Demographic Profiling.

8. A data recording system for enhanced recording of data generated during a Web session, the system comprising:
  a processor; and
  a computer readable medium coupled to the processor, wherein the computer readable medium includes multiple software layers stored therein and having data recording components for recording selected data generated during the Web session encoded in the multiple software layers, wherein the data recording components in the multiple software layers are placed (i) in deep layers of the software for inter-layer depth and (ii) in intra-layer locations deep within the layers for intra-layer depth, wherein:
    each of the deep layers for inter-layer depth is a layer whose content is more stable over time relative to content in at least a plurality of other layers that do not have the data recording components,
    for each of the intra-layer locations deep within the layers for intra-layer depth, content for the locations deep in the layer is more stable over time relative to content of at least a plurality of other locations in the same layer, and
    recording the data includes the data recording components saving the data to a memory.

9. The data recording system of claim 8 wherein the data recording and saving components are: generic and context insensitive.

10. The data recording system of claim 8 wherein the computer readable medium is selected from a set of a disk, tape or other magnetic, optical, or electronic storage medium and a network, wireline, wireless or other communications medium.

11. The data recording system of claim 8 wherein the data recording components are selectively implemented according to an analytical purpose for data recorded by the data recording components.

12. The data recording system of claim 11 wherein the analytical purpose is selected from one or more of the following: Feature Bundle Demand, Determining User Intent Behind Tradeoffs Under Constrained Configuration, Guided Selling and Needs Analysis Configuration Analyses, Imbalance and Correlation Between Demand and Offline Data, Regional Analysis, Time Series Analysis, Feature Substitutability, Decision Path Analysis, Price Sensitivity, or Demographic Profiling.

13. A non-transitory computer readable medium having a computer program stored therein, the computer program having multiple software layers and having data recording components for recording selected data generated during the Web session stored in the multiple software layers, wherein the data recording components in the multiple software layers are placed (i) in deep layers of the software for inter-layer depth and (ii) in intra-layer locations deep within the layers for intra-layer depth, wherein:
  each of the deep layers for inter-layer depth is a layer whose content is more stable over time relative to content in at least a plurality of other layers that do not have the data recording components,
  for each of the intra-layer locations deep within the layers for intra-layer depth, content for the locations deep in the layer is more stable over time relative to content of at least a plurality of other locations in the same layer, and
  recording the data includes the data recording components saving the data to a memory.

14. The non-transitory computer readable medium of claim 13 wherein the data recording components are: generic and context insensitive.

15. The non-transitory computer readable medium of claim 13 wherein the computer readable medium is selected from a group a consisting of: a disk and tape or other magnetic, optical, or electronic storage medium.

16. The non-transitory computer readable medium of claim 13 wherein the data recording components are selectively implemented according to an analytical purpose for data recorded by the data recording components.

17. The non-transitory computer readable medium of claim 16 wherein the analytical purpose is selected from one or more of the following: Feature Bundle Demand, Determining User Intent Behind Tradeoffs Under Constrained Configuration, Guided Selling and Needs Analysis Configuration Analyses, Imbalance and Correlation Between Demand and Offline Data, Regional Analysis, Time Series Analysis, Feature Substitutability, Decision Path Analysis, Price Sensitivity, or Demographic Profiling.

18. The method of claim 1 wherein primarily all of the data recording components are placed deep within layers of the server-side software architecture and deep within the layers of the server-side software architecture represents a location in the layers whose content is more stable over time relative to content in at least a plurality of other layers that do not have the data recording components.

19. The method of claim 4 wherein recording data using generic and context insensitive data recording components comprises recording attribute and value entries in multiple form entries using a single data recording component.

20. The method of claim 5 further comprising:
placing primarily all of the data recording hooks deep within layers of the server-side software architecture, wherein deep within the layers of the server-side software architecture represents a location in the layers whose content is more stable over time relative to content in at least a plurality of other layers that do not have the data recording components.

21. The method of claim 5 further comprising:
genericizing the data recording components; and
providing context insensitivity to the data recording components.

22. The method of claim 21 further comprising:
minimizing information collected by each data recording component.

23. The data recording system of claim 8 wherein primarily all of the data recording hooks are also encoded deep within layers of the server-side software architecture, wherein deep within the layers of the server-side software architecture represents a location in the layers whose content is more stable over time relative to content in at least a plurality of other layers that do not have the data recording components.

24. The data recording system of claim 9 wherein the data recording components are configured to record a minimal amount of information during each data recording component invocation.

25. The non-transitory computer readable medium of claim 13 wherein primarily all of the data recording hooks are also encoded deep within layers of the server-side software architecture, wherein deep within the layers of the server-side software architecture represents a location in the layers whose content is more stable over time relative to content in at least a plurality of other layers that do not have the data recording components.

26. The non-transitory computer readable medium of claim 14 wherein the data recording components are configured to record a minimal amount of information during each data recording component invocation.

27. The method of claim 1 wherein the content that is more stable over time represents content that remains unchanged over time to a degree that the data recording components continue to function properly after revisions of applications in the server-side software architecture.

28. The method of claim 5 wherein the content that is more stable over time represents content that remains unchanged over time to a degree that the data recording components continue to function properly after revisions of applications in the server-side software architecture.

29. The system of claim 9 wherein the content that is more stable over time represents content that remains unchanged over time to a degree that the data recording components continue to function properly after revisions of applications in the server-side software architecture.

30. The non-transitory computer readable medium of claim 13 wherein the content that is more stable over time represents content that remains unchanged over time to a degree that the data recording components continue to function properly after revisions of applications in the server-side software architecture.

* * * * *